US007881822B2

(12) United States Patent
Thornton et al.

(10) Patent No.: US 7,881,822 B2
(45) Date of Patent: Feb. 1, 2011

(54) SYSTEM AND METHOD FOR DISPENSING CONSUMER PRODUCTS

(75) Inventors: Curtis L. Thornton, Simi Valley, CA (US); Jeffery L. Vrachan, Agoura Hills, CA (US); Robert Ostrander, Saugus, CA (US)

(73) Assignee: Provision Interactive Technologies, Inc., Chatsworth, CA (US)

( * ) Notice: Subject to any disclaimer, the term of this patent is extended or adjusted under 35 U.S.C. 154(b) by 1065 days.

(21) Appl. No.: 11/059,575

(22) Filed: Feb. 16, 2005

(65) Prior Publication Data

US 2005/0251287 A1 Nov. 10, 2005

Related U.S. Application Data

(60) Provisional application No. 60/568,145, filed on May 5, 2004.

(51) Int. Cl.
*G01F 17/00* (2006.01)

(52) U.S. Cl. ....................... 700/244; 700/236; 700/237; 700/238

(58) Field of Classification Search ................. 700/236, 700/238, 244, 237; 382/115
See application file for complete search history.

(56) References Cited

U.S. PATENT DOCUMENTS

| | | | | | |
|---|---|---|---|---|---|
| 5,552,934 | A | * | 9/1996 | Prince | 359/629 |
| 5,553,934 | A | * | 9/1996 | Wells et al. | 312/128 |
| 6,598,976 | B2 | * | 7/2003 | Westort et al. | 353/28 |
| 7,330,035 | B2 | * | 2/2008 | Van Berkel | 324/671 |
| 2001/0011262 | A1 | * | 8/2001 | Hoyt et al. | 707/1 |
| 2002/0156704 | A1 | * | 10/2002 | Kolls | 705/27 |
| 2002/0184104 | A1 | * | 12/2002 | Littman | 705/26 |
| 2003/0035086 | A1 | * | 2/2003 | Robinson et al. | 353/10 |
| 2003/0156756 | A1 | * | 8/2003 | Gokturk et al. | 382/190 |
| 2004/0108990 | A1 | * | 6/2004 | Lieberman et al. | 345/156 |
| 2004/0148165 | A1 | * | 7/2004 | Beyerlein | 704/231 |
| 2005/0010876 | A1 | * | 1/2005 | Robertson et al. | 715/782 |
| 2005/0052714 | A1 | * | 3/2005 | Klug et al. | 359/3 |
| 2005/0094103 | A1 | * | 5/2005 | Robinson et al. | 353/10 |
| 2005/0202867 | A1 | * | 9/2005 | Cok | 463/30 |
| 2009/0170595 | A1 | * | 7/2009 | Walker | 463/25 |
| 2009/0228827 | A1 | * | 9/2009 | Robertson et al. | 715/782 |
| 2010/0171267 | A1 | * | 7/2010 | Walker | 273/274 |

* cited by examiner

*Primary Examiner*—Stefanos Karmis
*Assistant Examiner*—Michael Butler

(57) ABSTRACT

A system and method for selling and/or dispensing consumer products from a vending or transactional-based machine is disclosed. The vending or transactional-based machine comprises an aerial display device that displays an aerial image designed to attract the attention of potential consumers and sell advertising, special promotions or certain products. Once a consumer begins to interact with the vending machine, demographic data is collected or correlated with the product purchased or dispensed. The consumer can initiate and conclude a purchase by merely pointing at the desired product. A mechanism is provided that accepts payment by currency, credit card or electronically.

16 Claims, 4 Drawing Sheets

SYSTEM AND METHOD FOR DISPENSING CONSUMER PRODUCTS

CROSS-REFERENCES TO RELATED APPLICATIONS

This application is related to commonly assigned provisional patent application entitled "A System and Method for Dispensing Consumer Products" by Curtis L. Thornton et al, application No. 60/568,145, filed May 5, 2004 the entire disclosure of which is herein incorporated by reference.

BACKGROUND OF THE INVENTION

1. Field of the Invention

Embodiments of the present invention relate to vending machines. More particularly, embodiments of the present invention relate to an optimized system and method for dispensing consumer products.

2. Description of the Background Art

Vending machines are ubiquitous and an important source of retail sales for many companies. A wide variety of products are sold by vending machines. For example, cash, cold drinks, coffee, candy, potato chips, phone cards, maps, flowers and many other products. Other products, such as tobacco products, used to be sold through vending machines but are no longer because of concerns that unsupervised minor children could unlawfully purchase the products.

Typically, vending machines include a display portion so that the consumer can view the products available for purchase. The display portion may be window that permits the consumer to see the product hanging on dispensing hooks or a printed display applied to the exterior of the vending machine. Vending machines also include a mechanism for collecting currency, whether cash, credit card or debit card, a plurality of buttons by which the consumer may indicate their desired purchase, a mechanism for disbursing change and a mechanism for disbursing the purchased product.

Vending machines are often placed in locations that are convenient for consumers to access. Thus, they are often found in hotels, apartment complexes, factories, schools, gas stations, mini-marts, convenience stores, grocery stores, recreational areas, airports and other such places.

Vending machines have become so ubiquitous that consumers often by-pass vending machines in favor of making their purchase from a store or other location having a human attendant thereby raising costs. Accordingly, what is needed is a vending machine that attracts consumers and provides promotional content that encourages consumers to make a purchase from a vending machine.

With the increasing prevalence of time-shifting devices, such as digital cable video on demand or TiVO that allow home viewers to skip televised commercials, have put pressure on advertisers to find better ways to target consumers. Thus, what is needed is a vending machine that allows manufacturers of consumer products advertise using in-store promotions. Further, what is needed is a system and method for distributing and tracking the effectiveness of advertisements, coupons and other promotional material distributed from a vending machine. Further still, what is also needed is a vending machine for transactional vending that can dispense digital music, videos, coupons or promotional material.

SUMMARY OF EMBODIMENTS OF THE INVENTION

Embodiments of the present invention provide an improved vending or transaction-based machine. More specifically, embodiments of the present invention entice consumers to purchase their product from a vending machine and simultaneously provide an advertising platform for additional recurring revenue from the machine, i.e. coupons.

Embodiments of the present invention further provide a reliable contact-less mechanism that the consumer uses to select a product from a vending machine. These embodiments include a detection system that determines the consumer's selection without the use of buttons or other mechanical mechanism to select a product from the vending machine.

Embodiments of the present invention further provide a demographics model that provides an estimate of the biometrics, such as age, of the consumer who uses the vending machine to make a purchase. Demographic data are used to prohibit minor children from accessing product that they are not permitted to purchase from a vending machine.

Embodiments of the present invention also further provide a display system that entices the consumer to stop at a vending machine, to evaluate the product or products being sold and to purchase the product, and to provide an advertising platform upon which additional recurring revenue can be realized, by distributing coupons and promotional items or selling items such as phone cards or digital music to be downloaded to a telephone or MP3 player.

Embodiments of the present invention provide an aerial imaging system that projects three-dimensional images of products sold by the vending machine; a contact-less detector system that identifies the product selected by the consumer; and a demographics system that determines the age, sex, ethnicity and or other demographic information of the consumer at the point of sale; and optionally a mechanism for dispersing a printed receipt or a promotional flyer or coupon.

Embodiments of the present invention also further provide a computer-readable medium comprising instructions for: receiving content for display by aerial imaging system; displaying the content to attract consumers and provide an advertising platform for recurring revenue from the machine from coupons and other promotional items; displaying content in response to a consumer selection; dispensing product or transactional receipts selected by the consumer, and determining demographics summaries relating to the type of product purchased by each consumer class.

When the consumer returns to the advertising platform, they may enter identifying information to receive personalized content. To illustrated, once a consumer establishes a personalized profile and subsequently returns to the advertising platform, the system pushes a customized list of coupons or other promotional items.

A computer-readable medium is also provided by embodiments of the present invention with instructions for: monitoring utilization of a vending machine's products, determining an effective presentation for generating consumer purchases, monitoring the sale of product, and allocating products, receipts or coupons to vending machines that have history of sales of such allocated products.

Embodiments of the present invention further more specifically provide a vending machine system comprising a plurality of vending machines each having an aerial display system, a detector system that determines the product selected by the consumer; and a demographics system that determines the age, ethnicity and sex of the consumer at the point of sale. The vending machine system includes a communication network that couples each vending machine in the system to at least one server computer. The server computer receives sales data from each vending machine and delivers media content to each vending machine for display to consumers. Media content may include promotional collateral material such as coupons or informational brochures for disbursement to the consumers.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only and not by way of any limitation, wherein:

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the present invention relate to a vending machine, and, more specifically, to a vending machine having an improved mechanism for selecting product and for monitoring the sales activity of vending machines that are geographically widely dispersed. As used herein the phrase "vending machine" includes kiosks or other such stand-alone structures that may be used for transactional-based machines.

Embodiments of the present invention provide demographic data for determining the acceptance of a product among consumer groups by age, sex and race.

Embodiments of the present invention also further more specifically provide a computer-readable medium comprising instructions for: receiving content for display by aerial imaging system; displaying the content to attract consumer; displaying content in response to a consumer selection; dispensing product selected by the consumer, and determining demographics summaries relating to the type of product purchased by various consumer groups.

Figure 1:
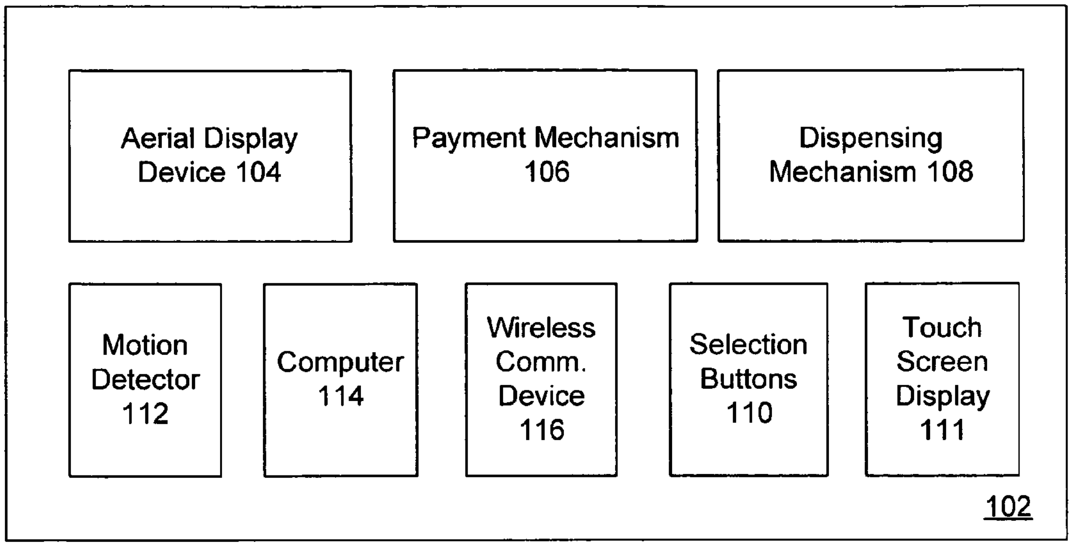
FIG. 1 is a block diagram of an exemplary vending machine in accordance with an embodiment of the present invention.

Referring now to the drawings more particularly by reference numbers, a block diagram of an exemplary vending machine 100 in accordance with an embodiment of the present invention is shown in FIG. 1. More specifically, vending machine 100 comprises an enclosure, indicated generally at 102, an aerial display device 104 for generating aerial images of the products sold by the vending machine or used to display advertising of other products/promotions, a payment mechanism 106 for accepting currency and for returning change, as appropriate, and a dispensing mechanism 108 for dispensing products when a consumer makes a purchase. While vending machine 100 may include a plurality of selection buttons 110 for selecting a product from a list of products, such buttons are optional. In other embodiments, a touch screen display 111.

A preferred embodiment of the present invention further provides a reliable contact-less mechanism that the consumer uses to select a product from a vending machine. This embodiment includes the step of generating an aerial image of the available products and a detection system that determines the consumer's selection without the use of buttons or other mechanical mechanism to select a product from the vending machine.

Product selection utilizes aerial imaging device 104 in combination with a gesture recognition system 112. In one preferred embodiment, gesture recognition system 112 includes a one, two, or three-camera or sensor array to detect a gesture by the consumer and computer code executed by computer 114 to interpret natural hand gestures. With gesture recognition system 112, touch-free control of the images displayed by aerial display device 104. In the preferred embodiment, gesture recognition system 112 adjusts to the consumer's height and location to optimize detection of hand gestures. Alternatively, gesture recognition system may be an infra-red or sonic monitoring device such as is used in home security systems. Touch-free interaction enables flexible positioning of the display. One preferred gesture recognition system is produced by Advanced Interfaces, Inc. of State College, Pa. and marketed under the Vision Interface Platform trademark.

Products, not shown, are positioned in the interior of enclosure 102. Products may include cold drinks, coffee, candy, potato chips, phone cards, cash, ring tones for cellular telephones, computer games, movie tickets, songs, videos, maps, flowers, coupons, product literature and many other products. Other products, such as tobacco products may be sold through selected vending machines that include an adult (age estimate) verification algorithm as described more fully below.

Embodiments of the present invention entice consumers to purchase their product from a vending machine. Rather than a static printed exterior, an aerial image is generated and displayed for the consumer. The aerial image is displayed so that it appears to be a three dimensional object to the human eye. This 3D image can changed at video rates to generate the floating image.

Aerial display system 104 is preferably an aerial imaging system available from Provision Interactive Technologies, Inc., the assignee of the present invention that is marketed under the HoloVision trademark. Aerial display system 104 is described in U.S. Pat. No. 6,808,268, which issued Oct. 26, 2004, the disclosure of which is incorporated herein by reference for all purposes.

Enclosure 102, currency mechanism 106 and dispensing mechanism 108 may be any appropriate device capable of providing the intended function. For example, if cold beverages are to be dispensed by vending machine 100, enclosure 102 may be a box-like insulated enclosure that includes a compressor for maintaining an ambient interior temperature sufficient to maintain the beverage at a selected temperature. If ring tones, songs or other electronic files are to be dispensed, then vending machine 100 includes a mechanism for interfacing with an electronic device such as a MP3 player, PDA or cell phone. In other instances, the dispensing mechanism provides an encoded plastic card that is programmed with electronic data.

Depending on the application currency mechanism 106 may be adapted to accept coins, paper currency, debit cards, credit cards, or all of the listed items. Mechanism 106 may further include a contact-less (wireless) receiver for receiving encoded signals from a device such as a smart card, radio frequency identification (RFID) card or a cellular telephone, using for example, Blue Tooth technology, for automatically deducting the purchase amount from an established account.

The aerial display system 104 is coupled to a communication network by a computer system 114 and a communication device 116. The communication device may be one of three preferred types of communication types: hard wired by a dial up (POTS) telephone line, wireless cell phone or satellite, or a Wi-Fi network. Preferably, device 116 utilizes the cellular telephone network to transfer information to a central location. Information transfer may occur on an automatic basis or in response to an externally supplied prompt. Thus, the daily sales records are transferred to the central location and recorded.

Figure 2:
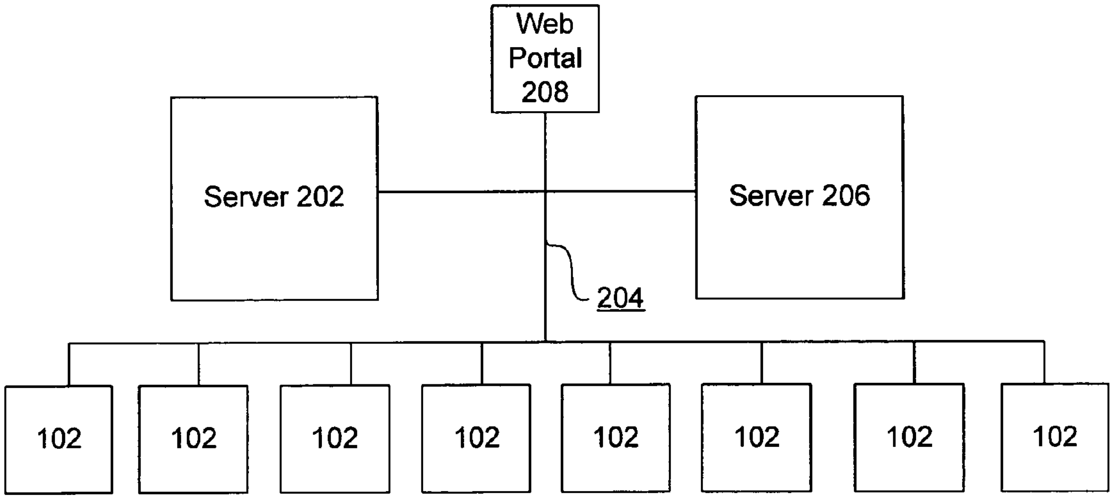
FIG. 2 is a block diagram of a system of vending machines in accordance with an embodiment of the present invention.

FIG. 2 illustrates a plurality of geographically distributed vending machines 100 coupled to a server system 202 by a communication network 204. In this manner, content can be downloaded from a remote server system 202 to each vending machine 100. Each vending machine includes aerial display device 104, as noted above, which in turn include computer system 114. Computer system 114 stores downloaded content in computer readable medium for display by aerial display device 104. Content may include an attraction segment to draw the attention of potential consumers and a sales segment that is directed to the sale of a specific product based on 1) customer demographics, 2) available products or 3) a consumer selection. Alternatively, the content may be other general advertising that may not be related to the products in the vending machine.

Computer system 114 also executes a computer program stored in computer readable medium that monitors for the presence of consumers who may be either watching the displayed content or who may desire to purchase a product.

When the consumer subsequently returns to the advertising platform, they may enter identifying information to receive personalized content. The identifying information may be a PIN or other personalized identification number or a biometric comparison such as fingerprint or facial feature. To illustrate, once a consumer establishes a personalized profile and subsequently returns to the advertising platform, the system pushes a customized list of coupons or other promotional items tailored to the individual needs or stated requirements of the consumer.

Each system 104 includes a high bright display that is capable of projecting an image through the optical path of aerial display system 104 and into the air for viewing by the consumer. This displayed image is projected away from the vending machine to cause potential consumers to stand in a specific area in order to best view the image. Thus, detector 112 may be focused on a defined area (where the consumer is motivated to interact with the image) to detect consumer motion. In this manner, consumers may reach for a displayed product thereby indicating their desire to purchase the product rather than manually pressing a product selection button on the exterior of the vending machine.

In other embodiments, the consumer is provided the opportunity to manipulate the image of the product before purchase. Thus, the consumer can rotate the image of the product, open the package to view the contents and, when satisfied, conclude the purchase by selecting a displayed aerial button or a mechanical button if provided on the enclosure of the vending machine.

The server system may comprise any suitable computer server executing any commercially available operating system and application program. In an embodiment of the invention, such as illustrated in FIG. 2, the server system may include a plurality of server machines, such as 202 and 206, which may be geographically dispersed in separate data centers, and a plurality of vending machines in addition to the number illustrated. Thus for an embodiment of the invention, the server system, in combination with any suitable communication network, load balancer and control programs, communicate with a plurality of vending machines each of which receives content and communicates transactions requests to the server system.

One or both of the servers 202 and 206 may support a web portal 208 through which statistical information may be monitored by a brand manager to verify the effectiveness of a promotional campaign. The web portal may also be used to encourage consumers to register for specific coupons to be delivered from the portal or at the vending machine 102.

Figure 3:
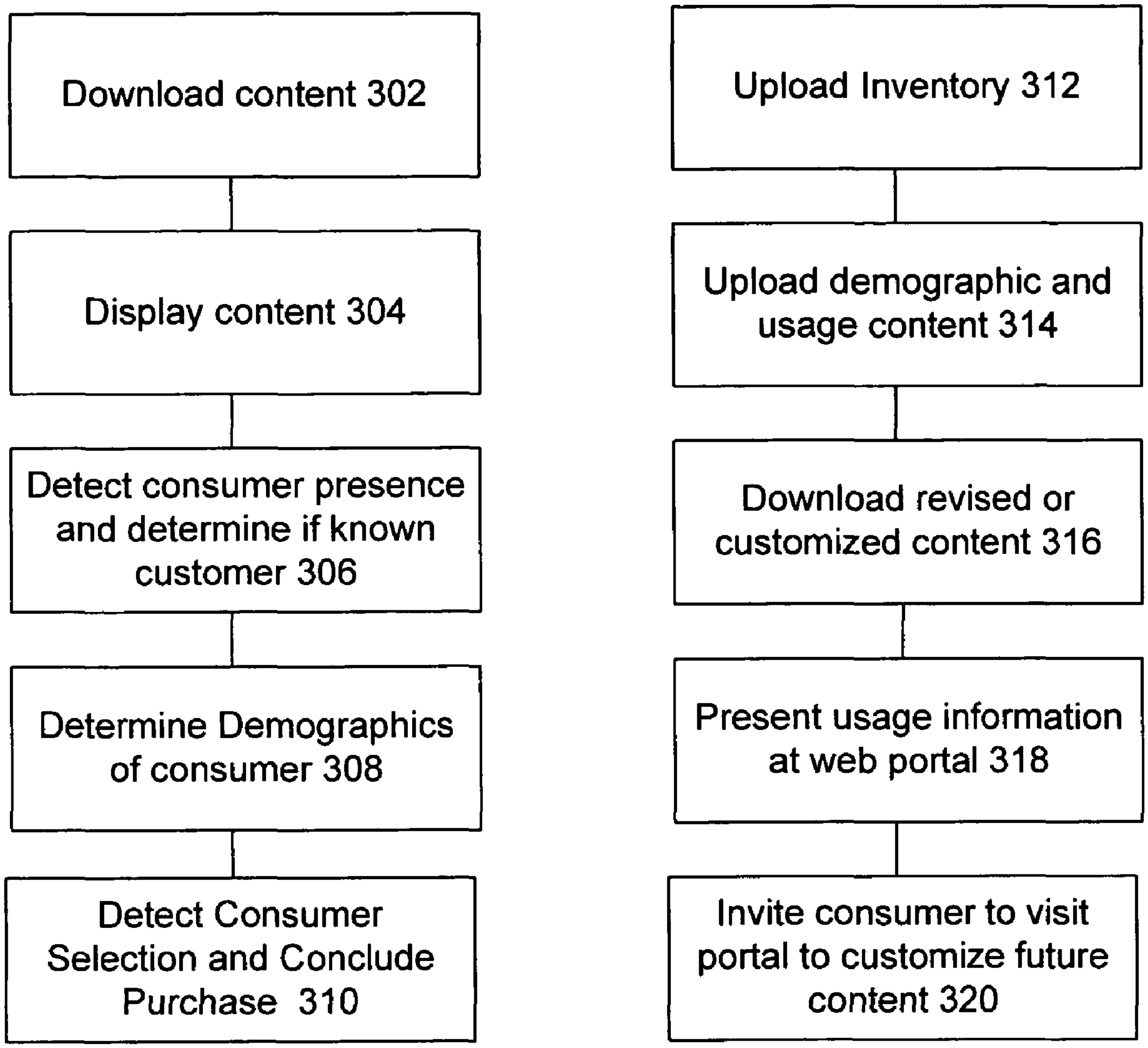
FIG. 3 is a flow diagram of an exemplary method for attracting and completing a sale to a consumer at a vending machine in accordance with an embodiment of the present invention.

FIG. 3 illustrates a method for improving vending machine operations. An embodiment of the present invention provides a display system that entices the consumer to stop, evaluate the product or products being sold and to purchases products.

Embodiments of the present invention further more specifically provide a vending machine system comprising a plurality of vending machines each having an aerial display system, a detector system that determines the product selected by the consumer; and a demographics system that determines the age, ethnicity and sex of the consumer at the point of sale. The vending machine system includes a communication network that couples each vending machine in the system to at least one server computer. The server computer receives sales data from each vending machine and delivers media content to each vending machine for display to consumers. Media content may include promotional collateral material such as coupons or informational brochures for disbursement to the consumers.

As is well understood, vending machine products are enclosed in the enclosure and a display device projects an aerial image of the products available for sale through the vending machine. Thus, once the vending machine is set up and stocked, content is downloaded as indicated at 302. The content may include various segments of video or graphics that are displayed for potential consumers passing by the vending machine. As indicated at step 304, the content is displayed to the consumer. The content may include an introductory segment that is always changing. The content may also include pricing information or product information or it may simply be an attention-getting video clip.

When a consumer or consumers stop to watch the content, the motion detector 112 provides the information on the number of the consumers to computer 114. The motion detector 112 also detects whether the consumer desires to purchase one of the products or is a returning customer who had indicated the need for customized content as indicated at step 306.

While the consumer is present in front of the vending machine, cameras are focused on the face and upper torso area of the consumer to determine demographic data associated with the consumers who either watch the video content and/or purchase a product from the vending machine as indicated at step 308.

Demographic data is automatically recognizes and classifies onlookers into different demographic segments including gender, race, and age-range. Using this data, management at the central location can continuously measure retail operation in terms of the number, duration and demographic composition of the audience. Further, using this information, the media content displayed by each vending machine can be changed, in real time, based on the demographics of the audience. Further still, using this data, adult products (such as tobacco or alcohol products) are not distributed to minors. A preferred demographic recognition algorithm is commercially available from Advanced Interfaces, Inc. and marketed under the Customer Intelligence trademark.

When the consumer deposits currency and the motion detector detects the consumer's choice, a purchase is concluded by dispensing the selected product as indicated at step 310. Selection in preferably occurs when the consumer points to a location in space in response to an aerial prompt. The consumer motion within the volumetric location during a defined time window indicates the consumer's choice.

At intermittent times or defined, each vending machine 100 will establish contact with server system 202 over the communication network 204. Then, computer 114 will upload an inventory report as indicated at step 312 and demographic and usage data as indicated at step 314. The server system 202 then determines if it is advisable to download revised or new content as indicated at 316.

The uploaded information is then made available on a web portal as indicated at 318 so that a brand manager can monitor coupon or product distribution and usage in real time. The web portal is also used by the consumer to customize the type of content to be displayed by either the aerial imaging device, a flat panel display or both. Further, if the consumer desires, they can indicate their preference as to the type of product for which they are interested in receiving product information, coupons or related promotional items as indicated at 320.

With the present invention, brand managers are provided with real-time vending machine and web portal statistics. It is thus possible to garner real-time return on investment statistical information from each in-store location and web portal activity. The consumer preferences are protected by a password before they are able to receive personalized coupons. The brand manager receives real time redemption statistics categorized by the day, week, month or time of day. The brand manager may also run statistics based on the promotion type, such as category of user interest, most impactful or creative ad or coupon, typical user demographic data, psychographics, promotion click-throughs or seasonality data.

At the point of sale, the aerial imaging device attracts attention while promotional features on either an optional screen or on the touch screen provides real-time incentives at point-of-purchase to increase sales. The consumer may redeem promotions coupons to obtain "access codes" for use on websites for other promotions or receive customized advertising/coupons based on their stated preferences.

Figure 4:
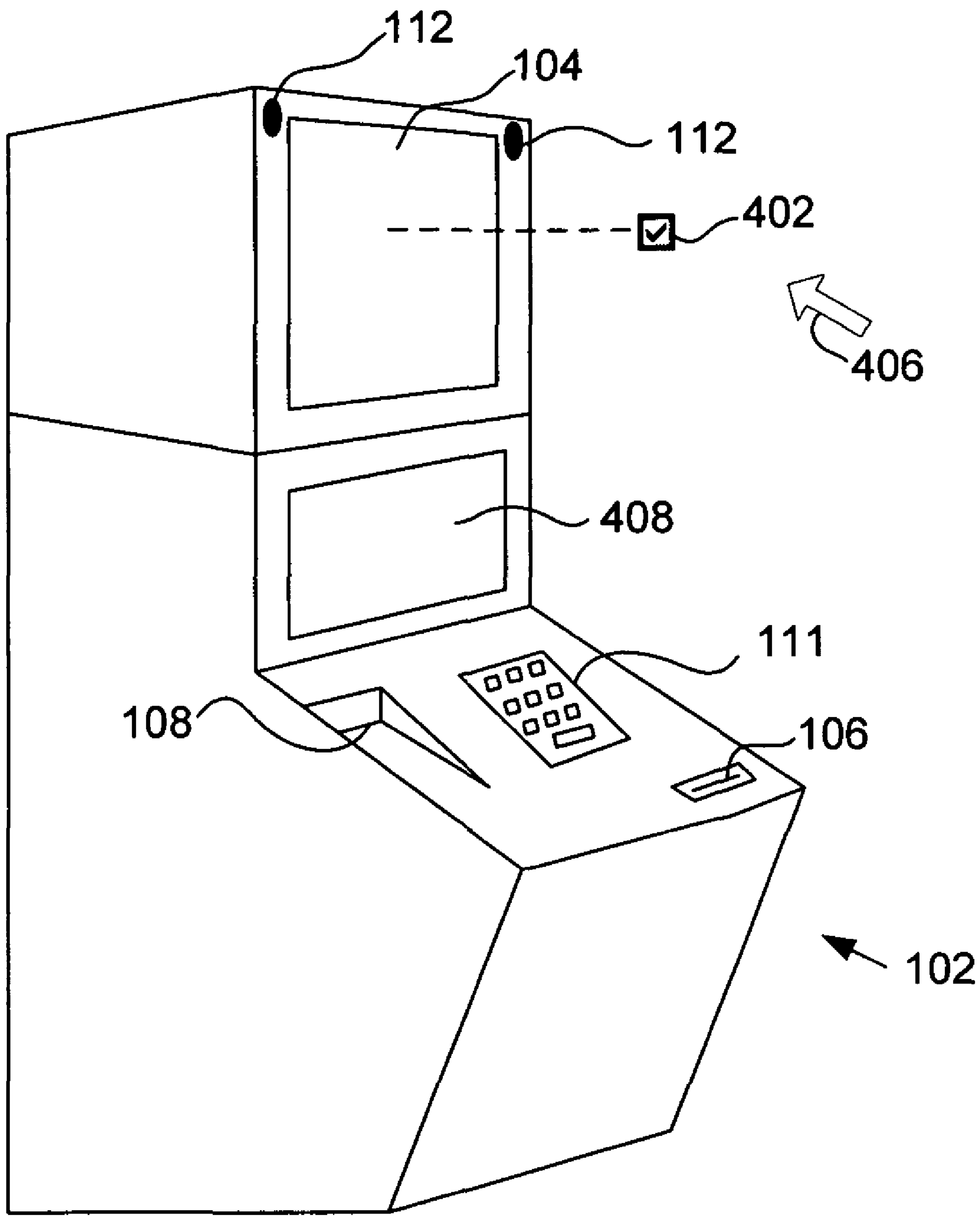
FIGS. 4 and 5 show exemplary vending machines in accordance with an embodiment of the present invention.
Figure 5:
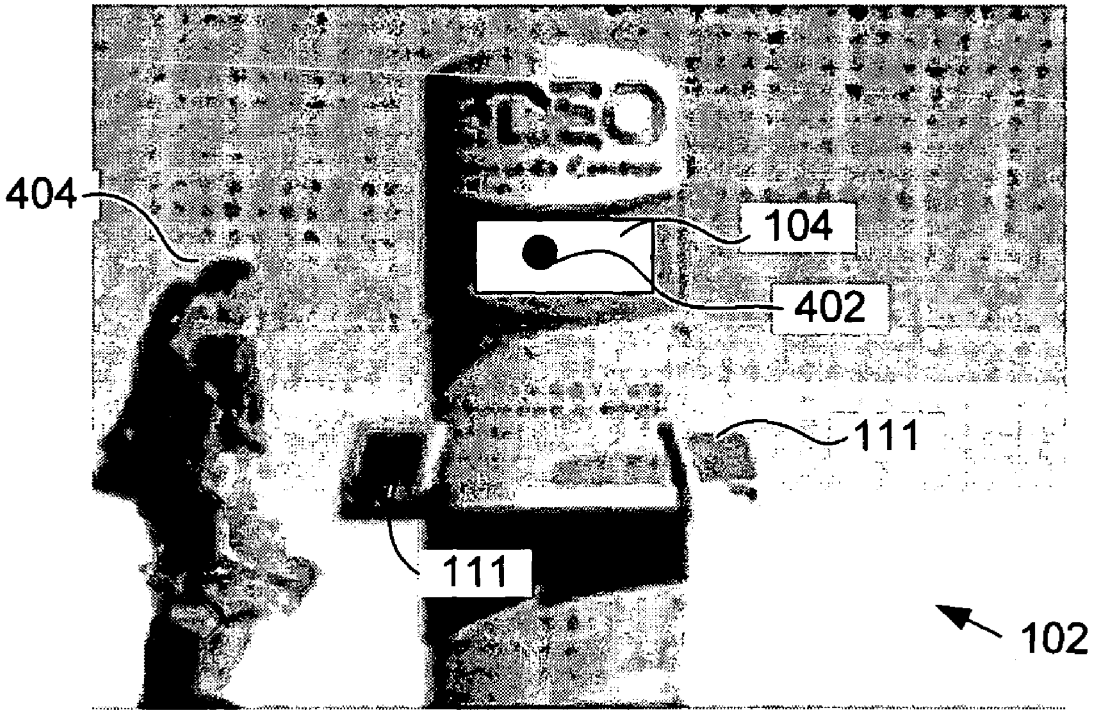

Embodiments of the present invention are shown in FIG. 4 having an aerial display system that generates an aerial image 402, a detector system 112 that determines the product selected by the consumer 404 by detecting a hand-gesture as indicated at 406; and a demographics system that determines the age, ethnicity and sex of the consumer at the point of sale. Products are dispensed through dispensing mechanism 108 and paid for by use of payment mechanism 106 or touch screen 111. Products may include promotional collateral material such as coupons or informational brochures for disbursement to the consumers as well as other products, such as food, drinks or any other product that may be sold or distributed by a vending machine. Sales are tracked by a computer internal to the vending machine.

Accordingly, the present embodiments enables product manufacturers, who currently use over a dozen methods to reach the consumer in-store, can now grab the consumer's attention at the point-of-purchase. The present invention provides a significant shift of in-store advertising allocations away from the prior art's passive methods to the interactive embodiments of the present invention.

A computer-readable medium is also provided by embodiments of the present invention with instructions for: monitoring utilization of a vending machine's products, determining an effective presentation for generating consumer purchases, monitoring the sale of product, and allocating products to vending machines that have history of sales of such allocated products. This information is transferred to a central server via the communication network.

A "server" or "server machine" for purposes of embodiments of the present invention may be any device having a processor. By way of example only, a "server machine" may be a mainframe computer, a personal computer executing server software, a server, or any of the like. By further way of example only, a "server machine" is merely representative of any type of computer-based product, and so forth. Further, a "server machine" may be any suitable server (e.g., database server, disk server, file server, network server, terminal server, etc.), including a device or computer system that is dedicated to providing specific facilities to other devices attached to the communication network. A "server machine" may also be any processor-containing device or apparatus, such as a device or apparatus containing CPUs or processors. A "server machine" further includes a software program running on a hardware device, representing a virtual computing machine.

A "processor" includes a system or mechanism that interprets and executes instructions (e.g., operating system code) and manages system resources. More particularly, a "processor" may accept a program as input, prepares it for execution, and executes the process so defined with data to produce results. A processor may include an interpreter, a compiler and run-time system, or other mechanism, together with an associated host computing machine and operating system, or other mechanism for achieving the same effect. A "processor" may also include a central processing unit (CPU) that is a unit of a computing system that fetches, decodes and executes programmed instruction and maintains the status of results as the program is executed. A CPU is the unit of a computing system that includes the circuits controlling the interpretation of instruction and their execution.

A "computer program" or "operating system" may be any suitable program or sequence of coded instructions that are to be inserted into a computer, well known to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images.

A "computer-readable medium" for purposes of embodiments of the present invention may be any medium that can contain, store, communicate, propagate, or transport a program (e.g., a computer program) for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory.

Reference throughout the specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases “in one embodiment,” “in an embodiment,” or “in a specific embodiment” in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term “or” as used herein is generally intended to mean “and/or” unless otherwise indicated. Combinations of components or steps will also be considered as being noted, where terminology is foreseen as rendering the ability to separate or combine is unclear.

As used in the description herein and throughout the claims that follow, “a,” “an,” and “the” includes plural references unless the context clearly dictates otherwise. Also, as used in the description herein and throughout the claims that follow, the meaning of “in” includes “in” and “on” unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A vending machine comprising:

an aerial display for projecting a 3D aerial image of a product in a space external to the aerial display;

a dispensing mechanism for dispensing the product in response to a purchase decision by a consumer;

a motion detector in combination with a gesture recognition system for determining the product selected by said consumer, wherein a hand gesture of said consumer is detected and recognized by said gesture recognition system to indicate the consumer selection of product by reaching at the projected 3D aerial image of the product in the space external to the aerial display;

means for determining demographics data of said consumer;

a computer for controlling operation of the vending machine; and a connection to a communication network.

2. The vending machine of claim 1 further comprising a server machine coupled to said vending machine by said communication network, wherein said server machine is adapted to transfer content, in addition to displaying said products, for display to said consumer by said aerial display.

3. The vending machine of claim 2, wherein said server machine is coupled to a plurality of additional vending machines by said communication network, wherein said server machine receives sales data from said vending machine and said additional vending machines, and delivers media content to each vending machine for display to consumers.

4. A method for operating a system of vending machines comprising the steps of:

downloading content to each vending machine;

displaying selected portions of said content;

detecting the presence of a potential consumer;

projecting a 3D aerial image of a product in a space external to said aerial display;

detecting and recognizing a hand gesture of said potential consumer to indicate a selection of product;

determining a consumer purchase selection, wherein said potential consumer reaches at said projected 3D aerial image of said product to select and purchase said product; and concluding a purchase in response to said consumer selection.

5. The method of claim 4 further comprising the step of detecting demographics data regarding said potential consumer.

6. The method of claim 4 further comprising the step of detecting a consumer request to examine an image of a selected product.

7. The method of claim 4 further comprising the step of prompting said potential consumer to indicate the selection of a product.

8. A computer to implement the method of claim 4.

9. A computer-readable medium having instructions for assisting in the implementation of the method of claim 4.

10. A vending machine system for a plurality of vending machines connected by a communication network, each vending machine comprising a plurality of products, a currency collection mechanism and a product dispensing mechanism, said vending machine comprising:

a detection system in combination with a gesture recognition system to detect and to recognize a hand gesture of a consumer for determining that a consumer's selection;

an aerial display system for displaying a changing, three-dimensional aerial image of products being sold; and a computer-readable medium comprising instructions for:

receiving content for display by aerial imaging system;

projecting 3D aerial images of products in a space external to the aerial display system according to the content to attract consumers;

displaying content in response to the consumer selection, wherein the consumer reaches at a projected 3D aerial image of a specific product to select the specific product; and dispensing the specific product selected by the consumer.

11. The vending machine system of claim 10 wherein said product dispensing mechanism comprises a printer for printing transactional receipts.

12. The vending machine system of claim 10 wherein said product dispensing mechanism comprises a plastic card bearing encoded information.

13. The vending machine system of claim 10, wherein said communication network couples each vending machine in the system to at least one server computer, and said server computer receives sales data from each vending machine and delivers media content to each vending machine for display to consumers.

14. The vending machine system of claim 13 wherein said media content comprises promotional coupons.

15. The vending machine system of claim 10 wherein said computer-readable medium further comprising the step of estimating biometric data obtained from said consumer for dispensing said specific product.

16. The vending machine system of claim 10 wherein the display of said content is determined by a said hand gesture recognition of said consumer.

* * * * *